United States Patent [19]

Potdevin et al.

[11] Patent Number: 5,679,007

[45] Date of Patent: Oct. 21, 1997

[54] PORTABLE INTERFACE FOR AN ELECTRONIC SMART CARD

[75] Inventors: Jean Marc Potdevin, Forges Les Bains; Andrew Morgan, Bagneux; Bruno Bizet, Macon, all of France

[73] Assignee: Schlumberger Industries, S.A., Montrouge, France

[21] Appl. No.: 499,460

[22] Filed: Jul. 7, 1995

[30] Foreign Application Priority Data

Jul. 13, 1994 [FR] France ................................. 9408722
Feb. 20, 1995 [FR] France ................................. 9501913

[51] Int. Cl.⁶ ................................................ H01R 9/09
[52] U.S. Cl. ................................. 439/76.1; 439/945
[58] Field of Search ........................... 439/59, 62, 377, 439/638, 593, 928.1, 945, 946

[56] References Cited

U.S. PATENT DOCUMENTS

| | | | |
|---|---|---|---|
| 2,952,810 | 9/1960 | Helton | 439/945 X |
| 5,053,199 | 10/1991 | Keiser et al. | 439/928.1 X |
| 5,184,282 | 2/1993 | Kaneda et al. | 439/945 X |
| 5,400,216 | 3/1995 | Tsai | 439/76.1 X |
| 5,457,601 | 10/1995 | Georgopulos et al. | 439/946 X |

*Primary Examiner*—Khiem Nguyen
*Attorney, Agent, or Firm*—Leonard W. Pojunas

[57] ABSTRACT

A portable interface for one or more electronic smart cards (74, 76), the interface being pluggable in a card reader, and comprising a module (80) that is designed to be received in the card reader and having at one end pluggable means (16) for making electrical connection with the card reader, an endpiece (18, 46, 78) secured to the other end of the module (10, 80) and including a slot (24, 48, 50) for insertion of the smart card, a housing (82, 84) designed to receive at least a portion of the smart card and passing through at least a portion of said endpiece, said housing guide and positioning means (101, 103, 102, 104) for the smart card, and electrical connection means (86, 96) for making electrical connection with the electrical contact tabs of the smart card.

16 Claims, 11 Drawing Sheets

PORTABLE INTERFACE FOR AN ELECTRONIC SMART CARD

FIELD OF THE INVENTION

The present invention relates to a portable interface for one or more electronic smart cards, said interface serving to provide connection between the electronic smart cards and a card reader of the type comprising a housing that is substantially a rectangular parallelepiped in shape, terminated by a connector half suitable for plugging into the reader, e.g. a reader of the kind used for PCMCIA type cards.

BACKGROUND OF THE INVENTION

The term "smart card" is used below to designate cards of rectangular shape well known to the public, such as bank cards, prepayment cards (e.g. for public telephones), cards giving access to premises, etc. The format of such cards is standardized; each of them carries an electronic chip which is situated at a specific location on the main surface of the card and its dimensions are about 85×54×1 mm.

In computers, it is becoming increasingly common to replace floppy disks by means of electronic memory cards having the same format as a smart card but of greater thickness. The housing of such a card is of substantially rectangular format being about 85 mm by 54 mm, and its thickness is uniformly 3.3 mm (type 1), or is 3.3 mm with a 5 mm thick central portion (type 2), or the thickness is 10 mm (type 3). The end of the housing is terminated by a 68 point female connector half. This type of card has been standardized by the "Personal Computer Memory Card International Association" (PCMCIA). These memories are very practical since firstly their pocket-sized format makes them easy to transport, and secondly they can have a memory capacity that is large and may reach several tens of megabytes. Most computer equipment, and in particular portable computers, include a PCMCIA type card reader.

Once plugged into the reader, the card may serve as a memory extension for the computer or it may perform other functions such as input/output, modem, or mass storage. The term "PCMCIA card" is used below not only for all cards that do indeed comply with the PCMCIA standard, but also for any similar cards that are substantially rectangular parallelepipeds in shape, and that are terminated at one end by a connector half.

Because the use of PCMCIA type cards and readers is becoming more and more widespread, it would be useful to be able to read smart cards by means of a PCMCIA type reader. Smart cards include either memory circuits or else a microprocessor associated with memory circuits. Their use is becoming more and more widespread. Smart cards and PCMCIA type cards are standardized to have the same dimensions: they have the same width and the same length. However they have different thicknesses: the thickness of an electronic smart card is about 1 mm, whereas the thickness of a PCMCIA card may lie in the range 3.3 mm to 10 mm. Another difference lies in the fact that the memories of a PCMCIA card are in the form of integrated circuits and they are included within the card itself, the card having a multipoint connector half at its end, whereas a smart card has an integrated circuit and contact tabs situated at well-defined locations on the main surface of the card. As a result, PCMCIA card readers cannot read smart cards, and vice versa, without modifying the reader.

Special card readers are already known that are capable of reading both smart cards and PCMCIA type cards. Such readers generally include a platform enabling them to adapt to the differences of card thickness, and also two different types of electrical connector, i.e. PCMCIA type and smart card type. By way of example, that type of reader is described in French patent application FR 2 687 238, and U.S. Pat. No. 5,198,645.

Another solution which is described in European patent application EP 0 552 078, consists in reducing the thickness of a PCMCIA card and in fitting an additional connector with flush contacts on its main face. It may be observed that in such a system, both cards, smart card and PCMCIA card are superposed within the reader. Since both cards have the same width they can be guided inside the card reader by the guide and positioning system of the reader. However the reader is designed for a PCMCIA type card and not for a stack comprising a smart card and a PCMCIA card. This gives rise to lack of positioning accuracy for the smart card. In addition, when an attempt is made to insert the smart card in a card reader that already contains a PCMCIA card of reduced thickness, misoperation can occur due to the fact that the space that remains for receiving the smart card is relatively small. It may also be observed that the space available for receiving electronic components, such as memories, inside the PCMCIA card of reduced thickness is considerably smaller than the space available in a conventional PCMCIA card. It is therefore not possible to house as many electronic components inside a card of reduced thickness as in a PCMCIA card of normal thickness. In addition, such a system is capable of reading only one smart card whereas, in some applications, it is necessary for the card reader to read a plurality of cards simultaneously.

Another solution is proposed by U.S. Pat. No. 5,296,692 which describes an adapter capable of being inserted in a reader. The adapter includes a receptacle capable of receiving a PCMCIA type card and a smart card, said cards being superposed one above the other. This results in the slot through which the cards are inserted being of greater width than the slot of a conventional card reader so the adapter does not have standard dimensions and cannot be used directly with an ordinary PCMCIA type card reader.

SUMMARY OF THE INVENTION

The present invention proposes a portable interface between one or more smart cards and a reader for PCMCIA type cards, while avoiding the drawbacks of prior art systems.

The invention proposes a portable interface that is pluggable in a card reader and that comprises:

- a module of substantially rectangular shape designed to be received in the card reader and including pluggable electrical connection means at one of its ends for connection with said card reader;
- an endpiece secured to the other end of the module and of width greater than the width of the module and including a slot for insertion of the smart card;
- a housing of substantially plane shape for receiving at least a portion of the smart card and passing through at least a portion of said endpiece from said slot, said housing including guide and positioning means for the smart card; and
- electrical connection means for making electrical connections with the electrical contact tabs of the smart card, said means being situated inside the interface.

Advantageously, the guide and positioning means are constituted by the side edges and the top and bottom inside surfaces of the housing.

The housing may be located entirely inside the endpiece or it may pass right through the endpiece and extend into the module.

The interface of the invention may include two or more superposed housings, each capable of receiving a smart card. The housings may occupy planes that are substantially parallel, or they may occupy intersecting planes. When the interface has two housings, one may be contained entirely within the endpiece while the other passes right through the endpiece and extends into the module. A set of integrated circuits situated in the module may be provided for connecting the electrical connection means to the pluggable electrical connection means for making electrical connection with the card reader.

The interface of the invention may also comprise a single housing having a slot that is suitable for receiving a plurality of electronic smart cards. Preferably, the housing becomes narrower along the length of the interface so that the smart cards inserted in the housing are mutually offset in use.

The module and the endpiece may advantageously be formed as a single part, e.g. a one-piece hollow body of molded plastics material, and it may include a cover made of metal and of very fine thickness.

BRIEF DESCRIPTION OF THE FIGURES

The invention will be better understood from the following description of various embodiments of the invention given with reference to the accompanying drawings, in which:

FIG. 1 show an embodiment of the invention that enables a single smart card to be inserted into the interface, FIG. 1a being a perspective view, FIGS. 1b and 1c respectively being a side view and a plan view, and FIGS. 1d and 1e being sections on two perpendicular planes;

FIG. 2 show an embodiment having two smart cards both received solely in the endpiece and in parallel manner, FIG. 2a being a perspective view, FIGS. 2b and 2c being respectively a side view and a plan view, and FIGS. 2d and 2e being sections on two perpendicular planes;

FIG. 4 show an embodiment of the invention with two cards, one being received solely in the endpiece and the other being received fully in the endpiece and in part in the module, FIG. 4a being a perspective view, FIGS. 4b and 4c being a side view and a plan view respectively, and FIGS. 4d and 4e being sections on two perpendicular planes; and FIG. 5 show another embodiment with two cards having a single housing for receiving them, FIG. 5a being a plan view, FIG. 5b being a side view, and FIGS. 5c and 5d being two sections on a vertical plane, with and without the cards, respectively.

DETAILED DESCRIPTION

The embodiment shown in FIG. 1 enabled a single smart card to be inserted into the interface. The interface is constituted by a module whose geometrical shape and dimensions are those of a type 2 PCMCIA card. The embodiments shown and described below comprise a module having the external appearance of a type 2 PCMCIA card. However, the module 10 could equally well have the appearance of a type 1, 2, or 3 PCMCIA card. Type 1 PCMCIA cards are rectangular in shape having a thickness of 3.3 mm; type 2 cards have the same thickness of 3.3 mm around their margins, but they have a raised central portion 14 defined by edges 30 with the total thickness of the card in this region being 5 mm. Like any PCMCIA card, the module includes pluggable means 16 at one of its ends constituted by a female connector half having 68 connections. The connector half 16 is pluggable in the male connector half of the card reader (not shown). The length of the module 10 is about 8.5 cm and its width is about 5.4 cm. These dimensions correspond substantially to the dimensions of a smart card. An endpiece 18 is fixed to the end of the module 10 remote from its connector 16. The endpiece 18 is in the form of a rectangular parallelepiped having the same thickness as the central portion 14 of the module 10. The width of the endpiece 18 is slightly greater than that of the module 10 and thus greater than the width of a PCMCIA type card or of a smart card. The projecting portions 20 and 22 of the endpiece form an abutment against the face of the card reader when the interface is inserted into the reader. The endpiece includes a slot 24 suitable for receiving a smart card 26 in a housing 28 situated in the endpiece. The edges 12 of the central portion 14 of the module 10 generally serve as Guide means for the PCMCIA card while it is being inserted into the card reader.

Figure 1A:
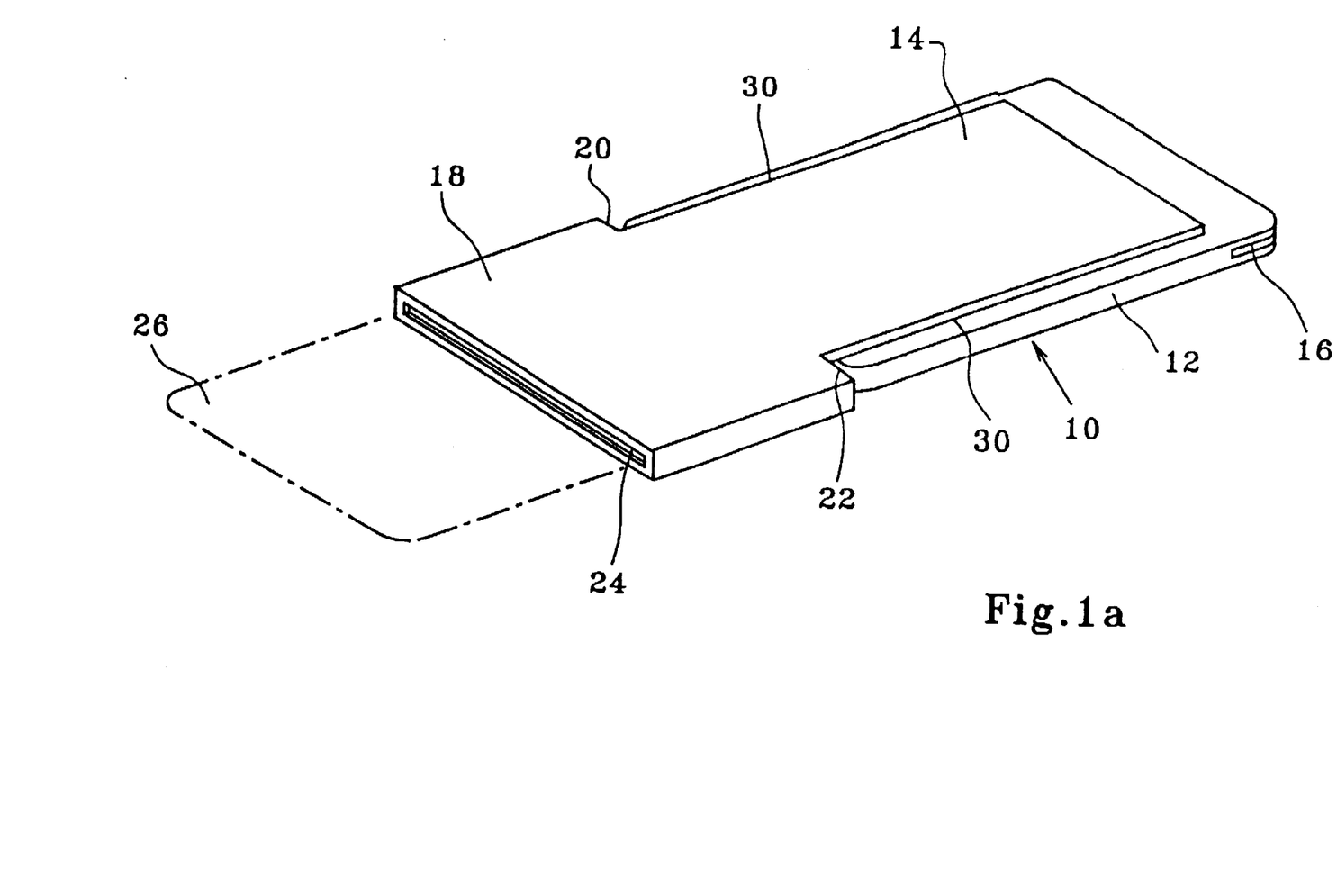
Figure 1B:
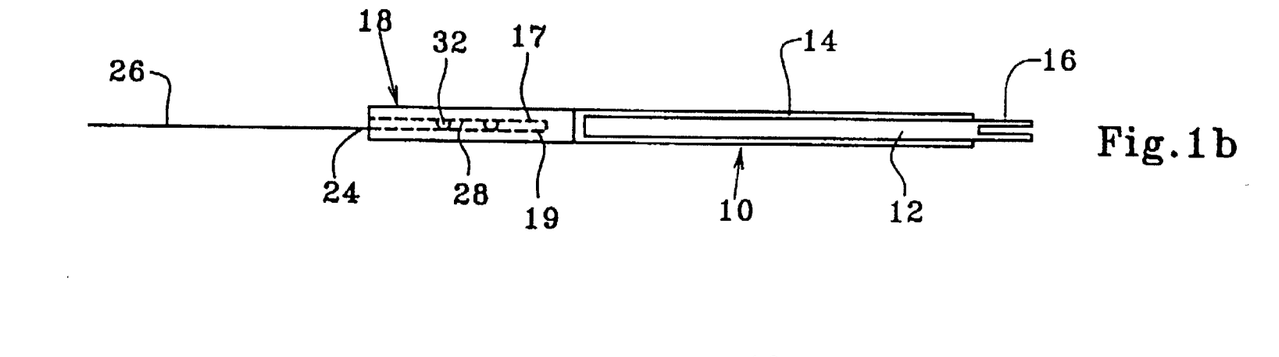
Figure 1C:
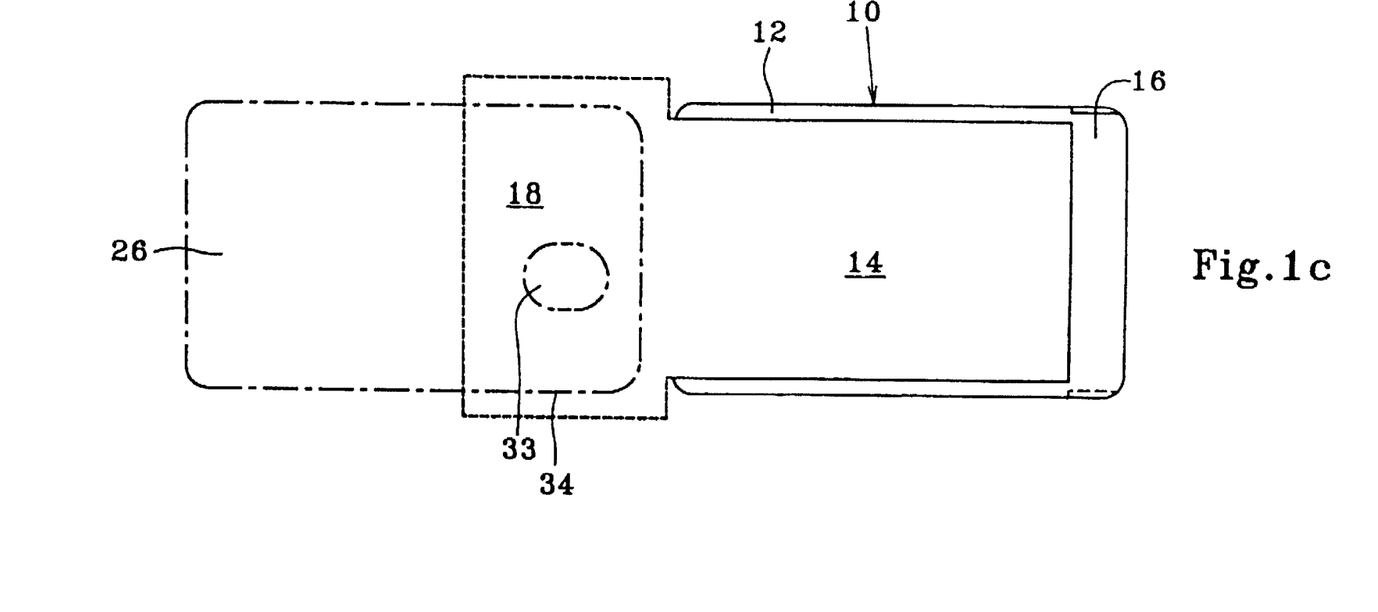

FIGS. 1b and 1c are respectively a side view and a plane view of the embodiment shown in FIG. 1a. The same elements are designated therein by the same references (and the same applied below for the other embodiments). Only the top of the interface is visible in FIG. 1a. Nevertheless, in FIG. 1b it can be seen that the bottom of the interface has the same shape as the top. There is thus a central portion 14 of the module 10 which is thicker than the edges 12. In FIG. 1b, the electrical connection means 32 can be seen for making contact with the electrical contact tabs 33 of the smart card (FIG. 1c).

The smart card 26 is inserted into the housing 28 (FIGS. 1d and 1e) located in the endpiece 18. The card is guided and positioned by guide and positioning means.

In the examples shown in the figures, the guide and positioning means are constituted by the solid surfaces that define the housing itself, i.e. by the side edges 34 (FIG. 1e) of the housing 28 and by the top and bottom inside surfaces 17 and 19 of the housing 28. The housing is rectangular in shape having height and width that are very slightly greater (by a few tenths of a millimeter) than the height and width of the smart card 26, such that the card is guided while it is being inserted. The depth of the housing 28 is sufficient for the side edges 34 and the surfaces 17 and 19 to serve as effective guide and positioning means for the smart card inside the housing. This depth is advantageously not less than three centimeters. The end 36 of the housing 28 serves to position the smart card when it comes into abutment against the end 36. Under such circumstances, a plurality of flush contactors 32 are situated facing and in contact with the contact tabs 33 situated on the surface of the smart cart. Each flush contactor 32 is in the form of a resiliently deformable spring blade secured to the endpiece 18 and having a curved end for coming into contact with one of the tabs of the card. The contactors 32 are connected by electric wires 37 to printed circuit 38 housed inside the module 10. The printed circuit 38 comprises a plurality of electronic components 40 such as integrated circuits. The connection between the printed circuit 38 and the connector half 16 is preferably a direct connection representing diagrammatically by 42 in FIGS. 1d and 1e, i.e. outlets from the printed circuit 30 are directly soldered to the terminals of the connector 16.

Figure 1D:
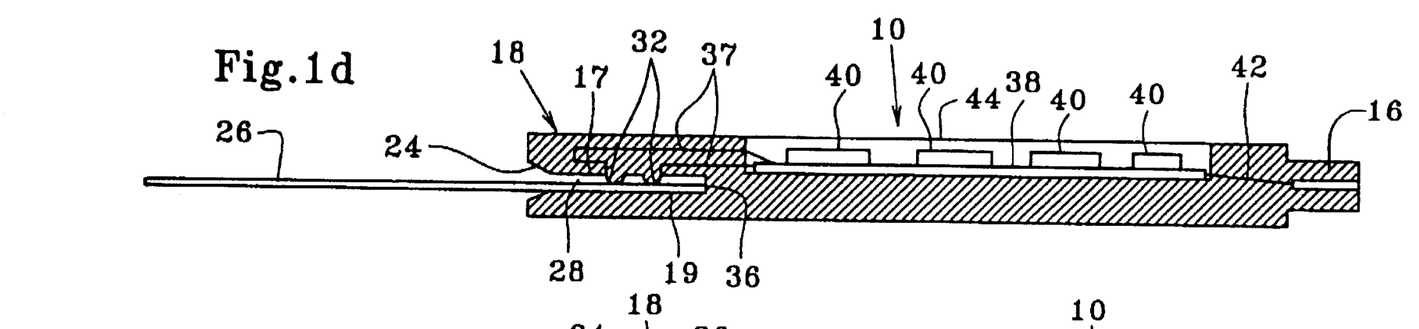
Figure 1E:
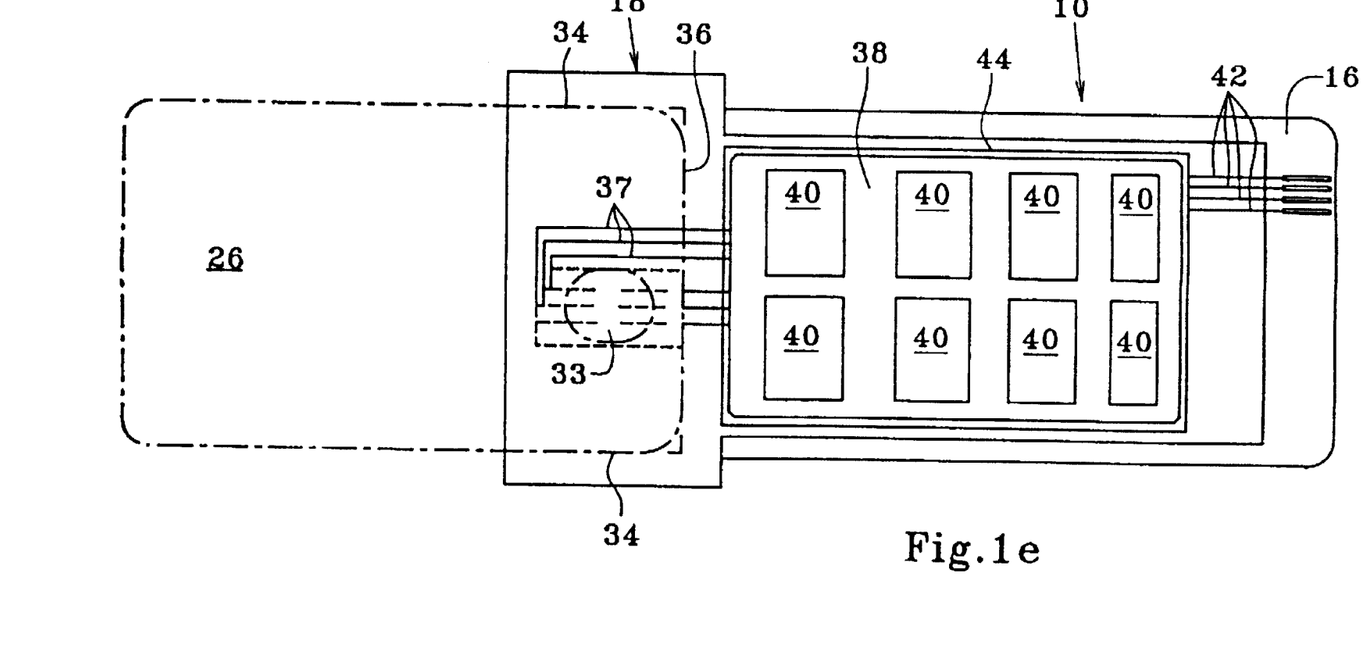

The printed circuit 38 together with its electronic components 40 may perform various different functions. Firstly it contains circuits dedicated to electronic supervision of the smart card 26, and also to supplying it with electrical power and clock signals. This supervision may comprise interchanging data between the smart card and the apparatus to which the interface is connected, or it may comprise processing data supplied by the smart card prior to transferring said processed data to the apparatus to which the interface is connected.

The circuit may also perform other functions, such as storing information in a mass memory or in a solid state memory (volatile or otherwise), increasing the memory capacity of the computer in which the interface is connected, or performing input/output functions such as network interfaces, telecommunications interfaces, or interfaces with any other type of apparatus. In which case, the additional functions may benefit from the simultaneous presence of one or more smart cards, e.g. for the purpose of providing security of access to data or to networks, for verifying user rights, for signing or encrypting a transaction, or for paying for the use of the functions or services offered by the circuit.

In the preferred embodiments shown in FIGS. 1 to 4, the module 10 and the endpiece 18 form a single part so as to increase the overall robustness of the interface. This part is advantageously molded in a plastics material in which the space inside the module is adapted to contain the printed circuit 38 with its components 40. This space is closed by means of a cover 44 which is preferably made of metal and very thin, and which is fixed onto the module 10. The cover makes it possible to install the printed circuit 38 and to gain access to the circuit should that be necessary. The housing 28 is also formed in the plastics part constituted by the module 10 and the endpiece 18. The connectors 32 are preinstalled in the endpiece 18 together with the connection wires 37.

Figure 2A:
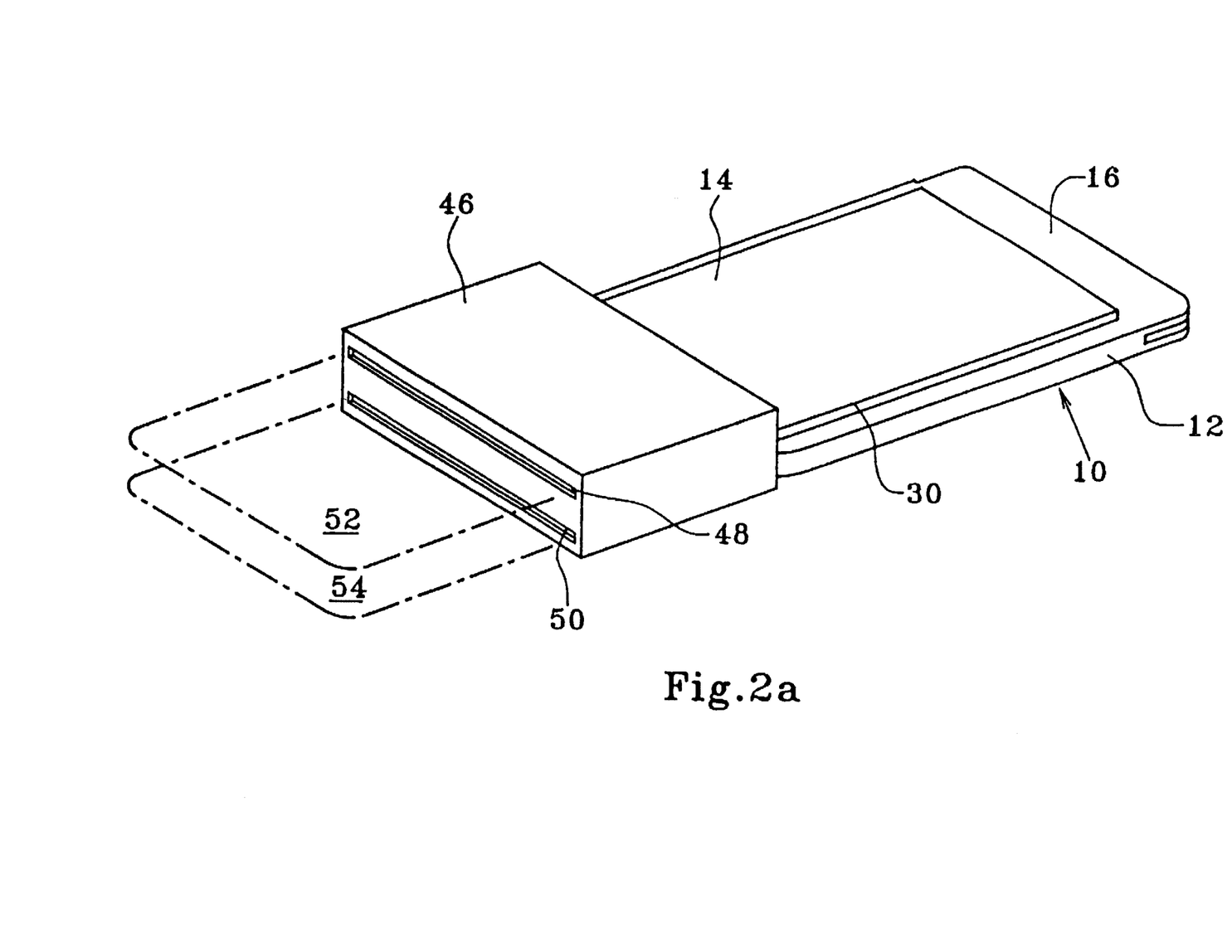
Figure 2B:
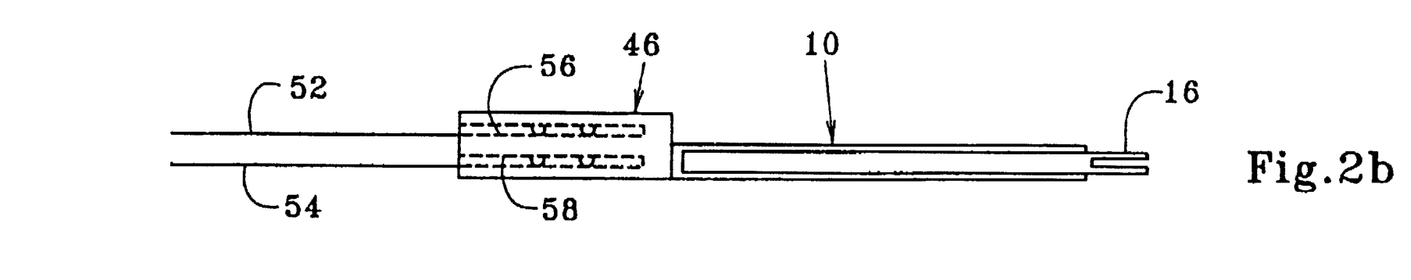
Figure 2C:
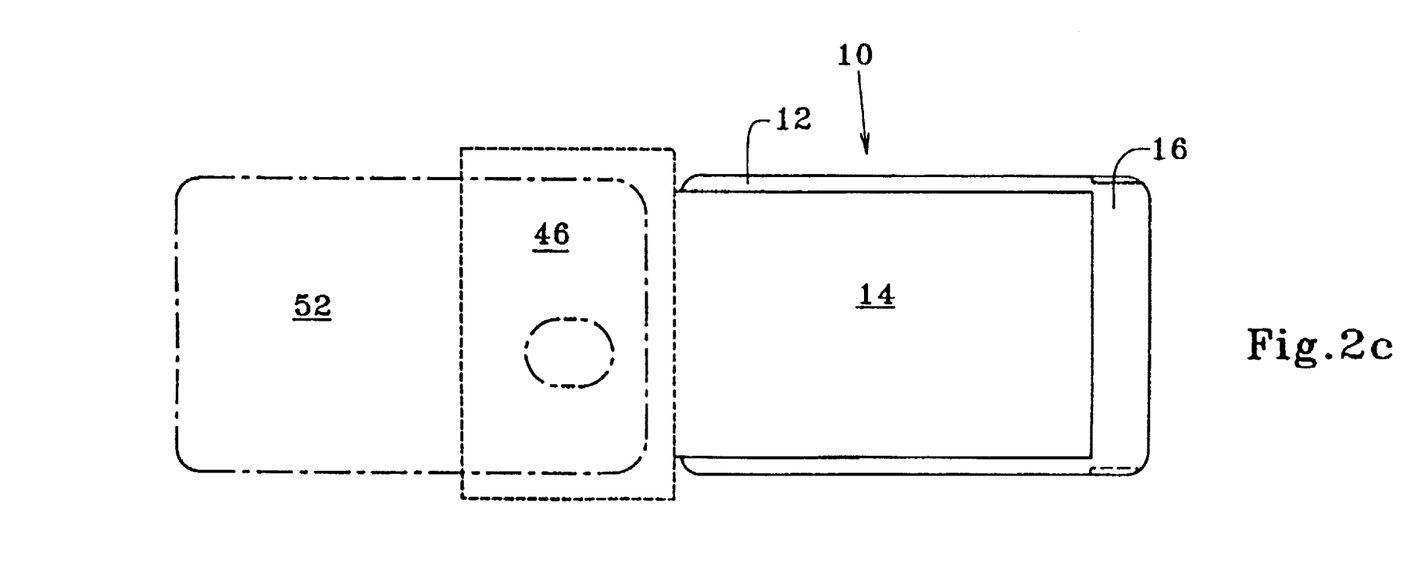
Figures 2D, 2E:
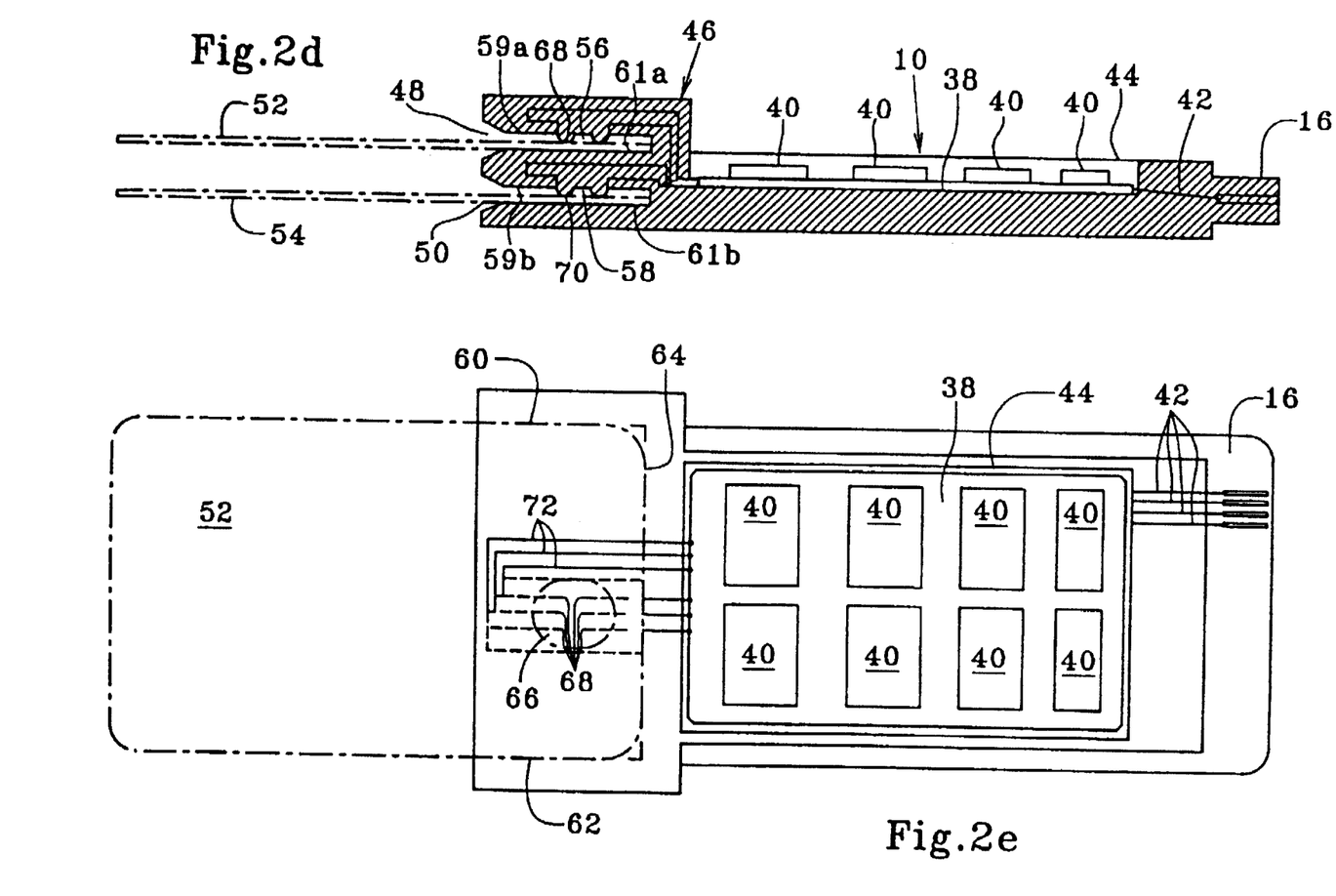

In the embodiment of FIG. 1, the smart card housing 2 is entirely contained within the endpiece 18. FIGS. 2a to 2e show an embodiment of an interface enabling two smart cards to be connected to a PCMCIA type card reader. The endpiece 46 has two slots 48 and 50 through which the respective smart cards 52 and 54 are inserted. The thickness of the endpiece 46 is greater than in the embodiment of FIGS. 1. This thickness is about 1 cm. The module 10 is identical to that of FIG. 1. It thus has the shape and dimensions of a type 2 PCMCIA type card, namely a thicker central portion 14 (about 5 mm thick) and thinner margin portions 12 (about 3.3 mm thick). At its end remote from the endpiece 46 it includes a pluggable connector half 16. In FIGS. 2b and 2c which are respectively a side view and a plan view it can be seen that the endpiece 46 has two housings 56 and 58 contained within the endpiece 46. These housings are rectangular in shape and of width that is very slightly greater (by a few tenths of a millimeter) than the standardized width of smart cards (FIGS. 2d and 2e). As a result, the side edges 60 and 62 of the two identical housings 56 and 58 serve as guide and positioning means for the two smart cards 52 and 54. The same applies to the top and bottom inside surfaces 59a, 59b and 61a, 61b of the housings 56 and 58 respectively, the height of these housings being slightly greater (by a few tenths of a millimeter) than the thickness of a smart card. The end 64 of each of the two housings 56 and 58 is likewise used as depth positioning means. When the cards are installed in the housings, the electrical contact tabs 66 face flush contactors 68 and 70. The housings 56 and 58 extend in two parallel planes such that the two cards 52 and 54 are parallel to each other when inserted in the housings. Electric wires 72 connect the contactors 68 and 70 to the printed circuit 38. This circuit contains electronic components 40 as mentioned above, together with contacts 42 connecting with the pluggable connector half 16.

In the embodiment shown in FIG. 1, as in the embodiments described below, the endpiece 46 and the module 10 are advantageously formed as a single molded part (in order to increase the robustness of the interface), which part is fitted with a cover 44.

Figure 3:
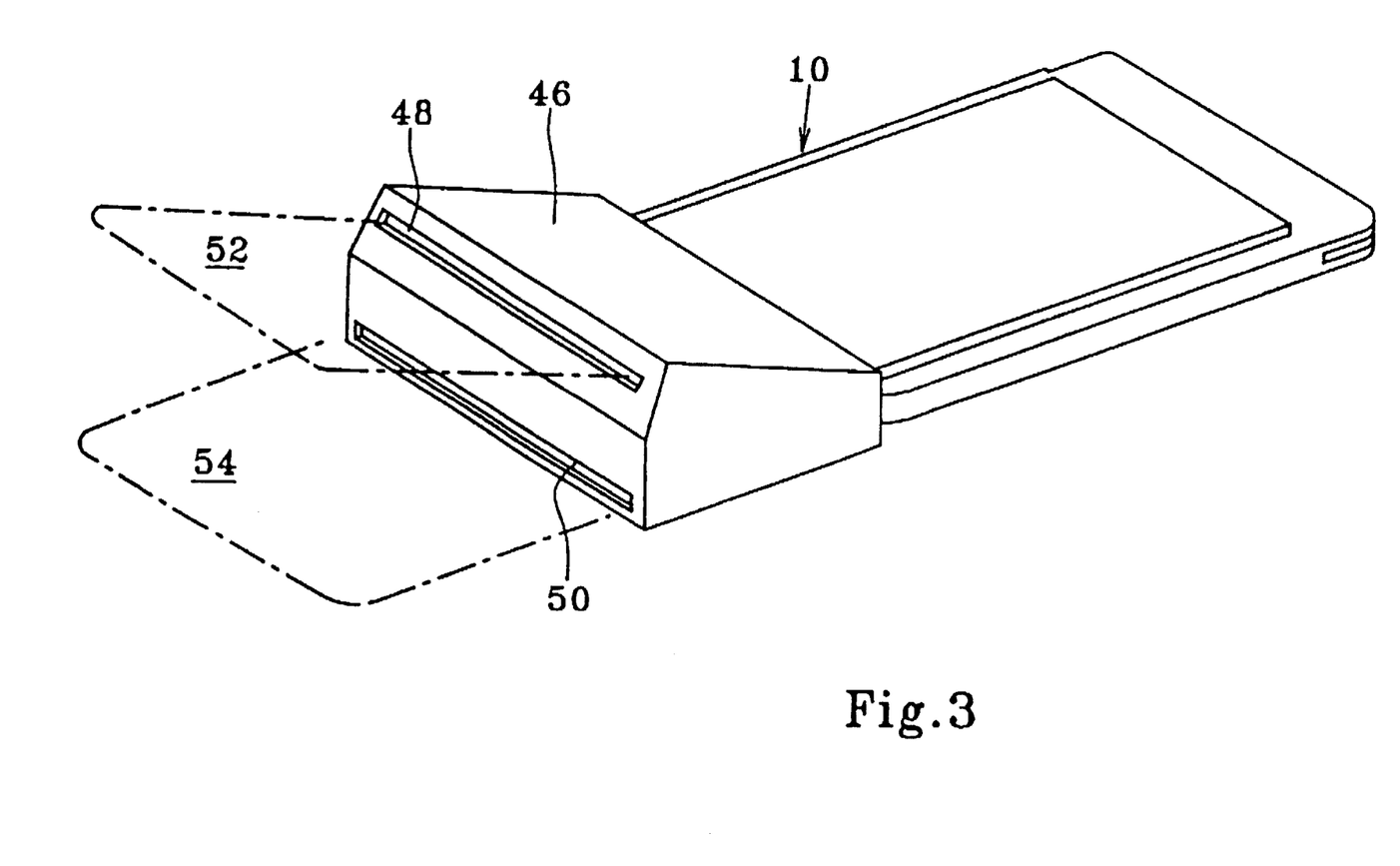
FIG. 3 is a perspective view of an embodiment having two smart cards situated in two intersecting planes.
Figure 4A:
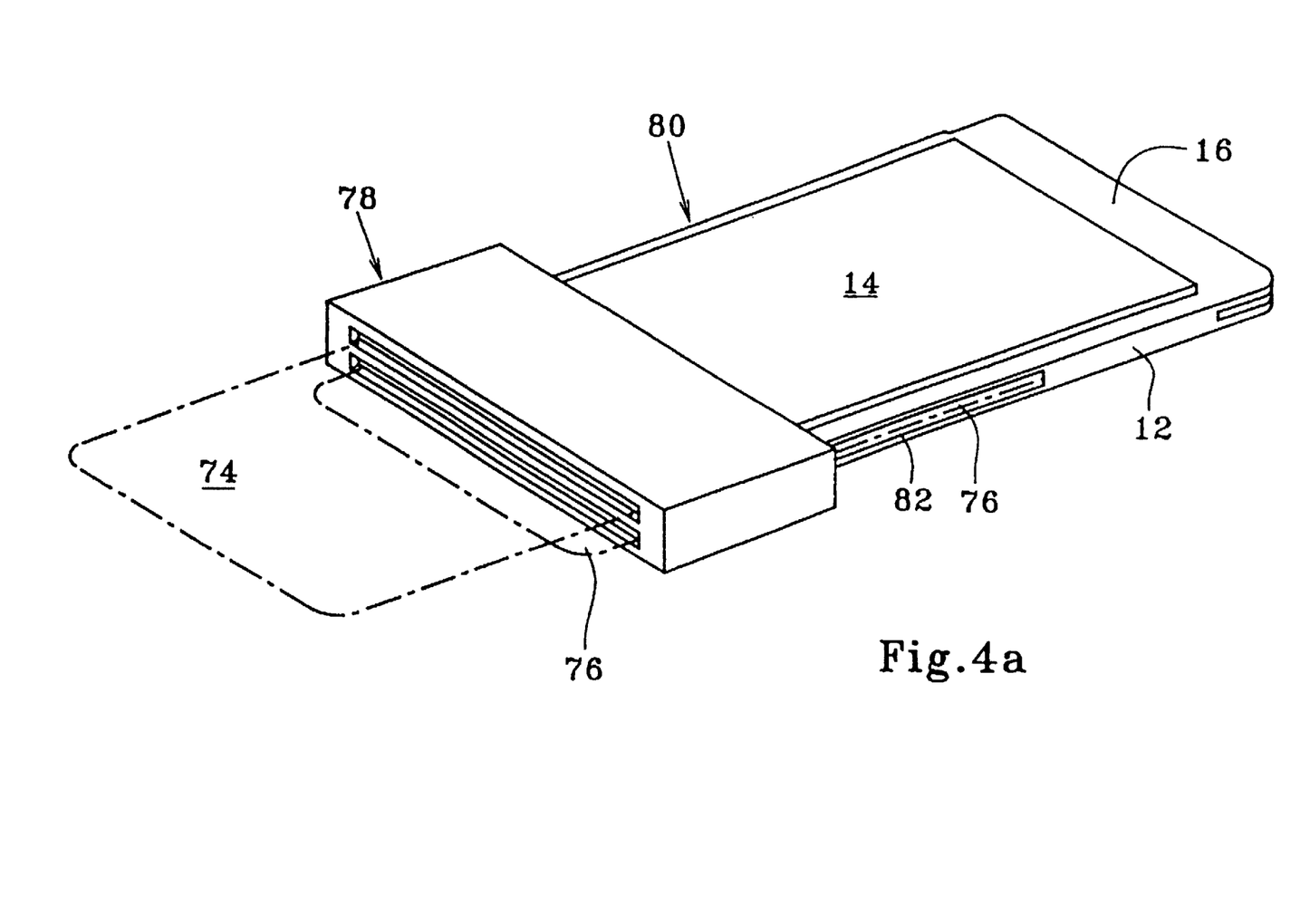
Figure 4B:
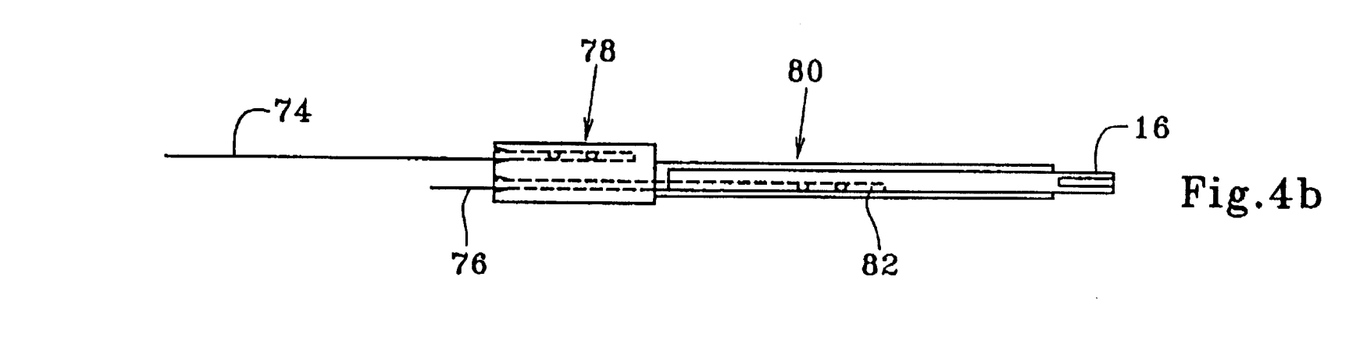
Figure 4C:
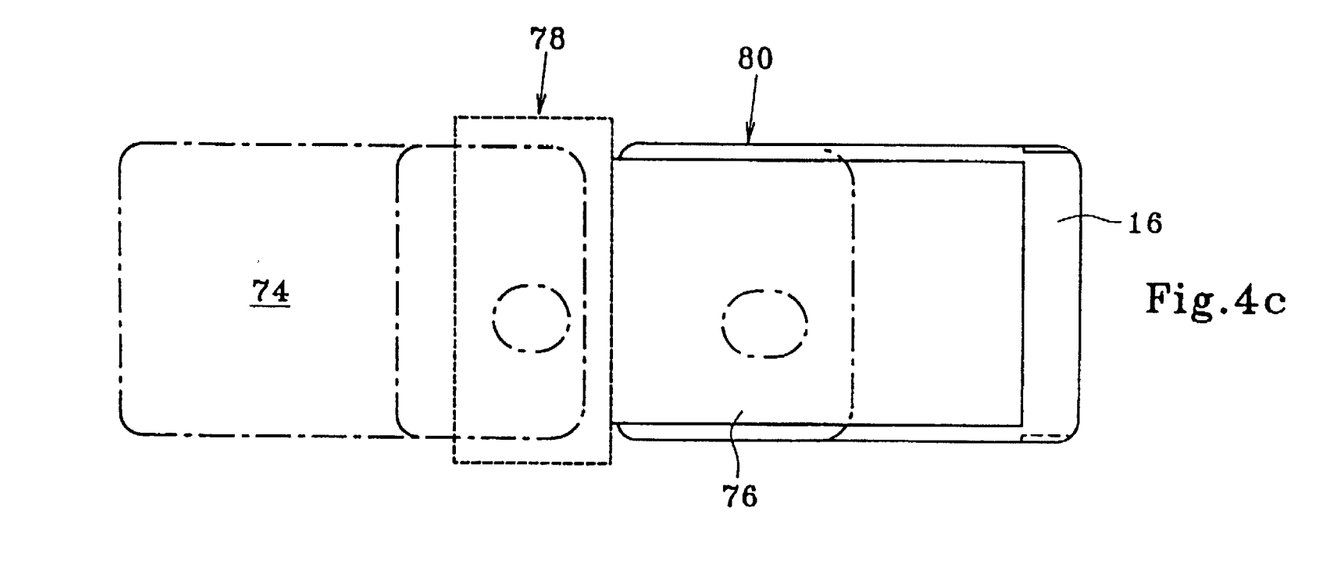
Figure 4D:
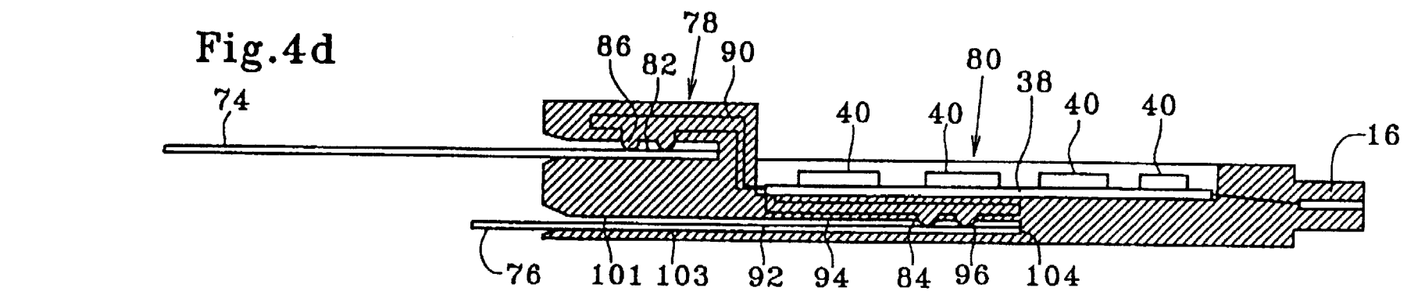
Figure 4E:
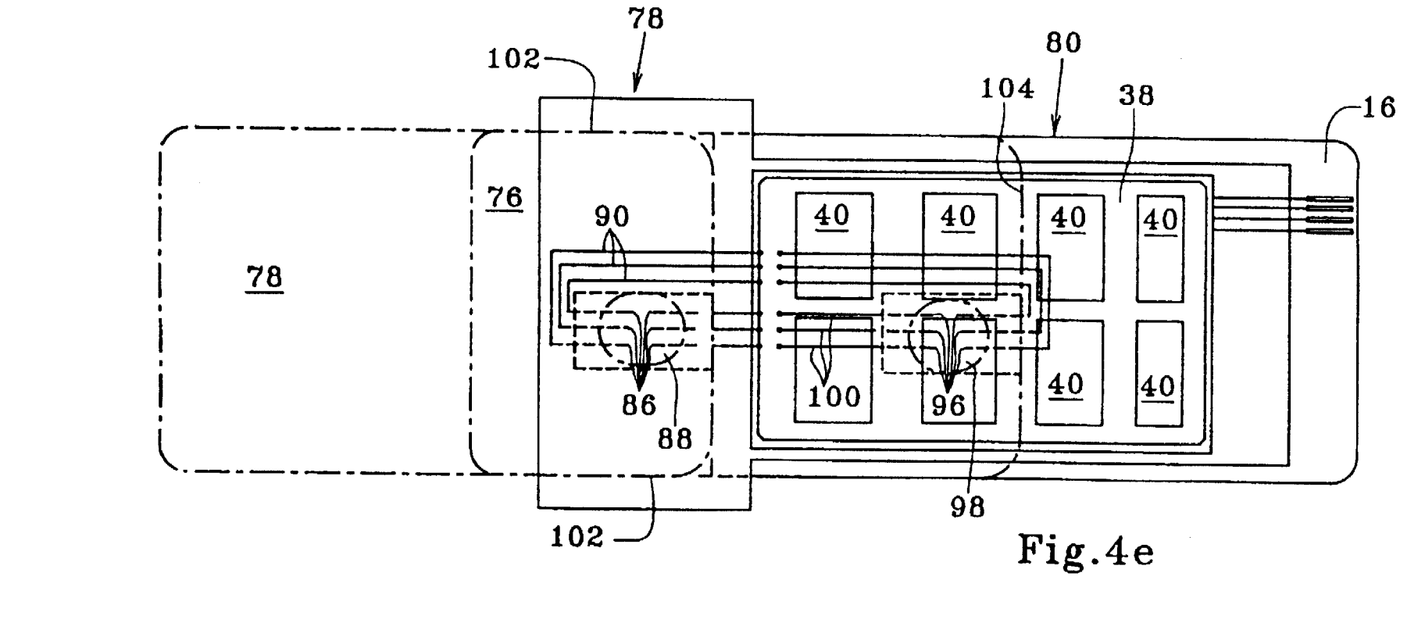

FIG. 3 shows an embodiment identical to that shown in FIG. 2 except with respect to the orientations of the housings 56 and 58 in the endpiece 48. When the two housings are relatively close to each other, it can be difficult to insert or withdraw one of the two smart cards 52 and 54 when the other one is already in place. To avoid this drawback, the two housings 56 and 58 are oriented to occupy two intersecting planes. In other words, the two smart cards 52 and 54 are in two intersecting planes that converge towards the module 10, such that the outermost ends of the two cards are further apart from each other than the distance between the two slots 48 and 50. This makes it easier to insert or withdraw the cards 52 and 54.

The embodiment shown in FIG. 4 enables two smart cards 74 and 76 to be connected to a PCMCIA type card reader. It differs from the embodiment shown in FIG. 2 by the fact that one of the two housings for receiving the smart cards is contained solely within the endpiece 78 whereas the other housing passes right through said endpiece and extends into the module 80. The outside shape and dimensions of the interface are identical to those of the embodiment of FIG. 2. In the same manner, the module 80 includes a connector half 16 and a central portion 14 of greater thickness than its sides 12. However, the module 80 includes a lateral slot 82 through which the smart card 76 can pass. This slot is naturally necessary since the smart card and the module 80 are of substantially identical width. The two housings 82 and 84 (FIG. 4d) are situated in two substantial parallel planes. Naturally, it will readily be understood that this need not necessarily be the case, as in the embodiment of FIG. 3, in which case the housing 82 could slope relative to the housing 84. The housing 82 is fully contained in the endpiece 78. The lateral edges, the top and bottom inside surfaces and the end of the housing serve as guide and positioning means for the card 74 as in the preceding embodiments. Flush electrical contactors 86 are placed in the housing 82 so that when the smart card 74 is in position, the contact tabs 88 of the smart card face the contactors 86. Electric wires 90 connect the contactors 86 to the printed circuit 38 of the module 80.

The housing 84 comprises a first portion 92 that passes right through the endpiece 78 and that is extended by a portion 94 in the module 80. In this portion 94 there are flush contactors 96 situated facing the contact tabs 98 of the smart card when it is in position in the housing 84. Electric wires 100 connect the contactors 96 to the printed circuit 38. The contactors 96 may also be directly soldered to the printed circuit 38. While it is being inserted into the housing 84, the card 76 is guided by the side edges 102 and by the top and bottom inside surfaces 101 and 103 of the portion 92 of the housing 84 that is in the endpiece 78. These edges 102 and these surfaces 101 and 103 are mutually parallel and they are situated at distances apart that are very slightly greater than the width and the thickness respectively of a smart card. The card is positioned in depth by the end 104 of the housing 84.

As in the preceding embodiments, the endpiece 78 and the module 80 are formed as a single part which is preferably made of molded plastics.

The embodiment of FIG. 4 is particularly advantageous when it is desired to use two smart cards simultaneously, one of which, the card 76, remains for a much longer period of time in the interface than does the other card. For example, the card 76 may be used throughout an entire day, whereas the other card 74 may be used for a relatively short period, e.g. about 10 minutes. Thus, the card 76 remains all day in the housing 84 whereas the housing 82 may receive a large number of smart cards in succession.

The end 36, 64, or 104 of each of the housings 28, 56, 58, 82, or 84 in each of the embodiments described is advantageously provided with a microswitch (not shown in the figures) for detecting the presence and/or proper positioning of the smart card in its housing.

Figure 5A:
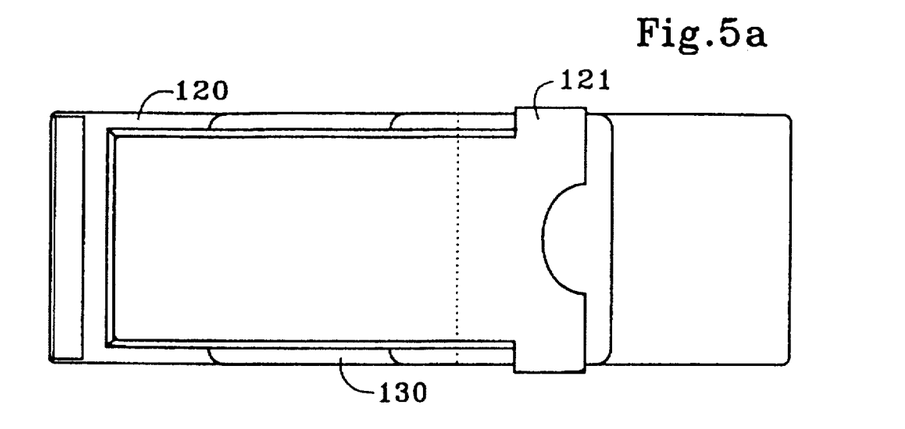
Figure 5B:
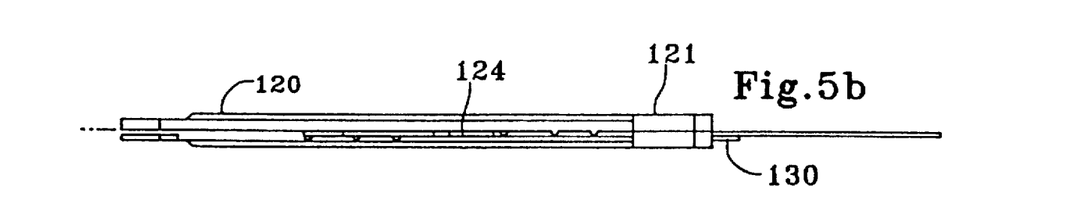
Figure 5C:
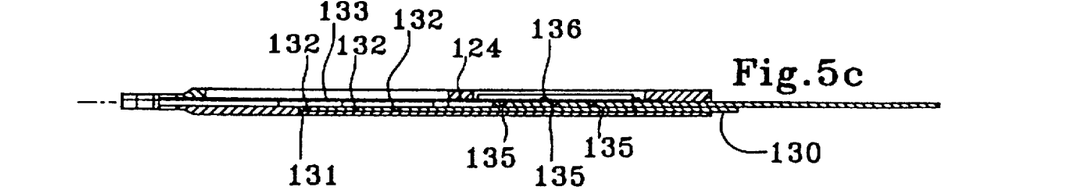
Figure 5D:
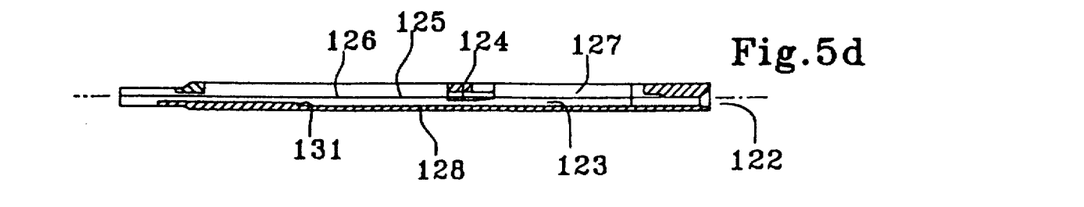

FIGS. 5a, 5b, 5c, and 5d show an extension of the embodiment of FIG. 4, in which there is only a single housing but it is suitable for receiving two smart cards. As in the preceding embodiments, the interface comprises a module 120 designed to be received in a card reader, an endpiece 121 having a slot 122 suitable for receiving two cards, and a housing 123 in which both cards are positioned in use. The housing is made narrower at some point by projecting means 124 that project from the top inside surface 125 of the housing and that subdivide the housing into two portions 126 and 127. The projection 124, the bottom inside surface 128, and the side edges of the housing serve to position a first card 130 in the housing as shown in FIG. 5c, the end of the card coming into abutment against the end 131 of the housing 123. In this position, the contact tabs 132 of the card are directly beneath and in contact with the flush contacts 133 of the interface. The card is held between the projection and the bottom inside surface of the housing, that hold the card firmly in the housing.

The housing may be made in two steps, or it may be made with a top inside surface that comes down, e.g. to make the space narrower towards the end of the housing and so as to offset the cards in the housing.

The second card is inserted in the slot between the top surface of the first card and the top inside surface of the housing which together serve as guide means. The projection 124 serves to stop further progress of the card into the housing so that this card is positioned with its contact tabs beneath flush contacts 136 of the interface. To prevent one card rubbing on the other, an intermediate metal sheet (not shown in FIG. 5) may be added inside the housing so as to separate the housing into two portions for the purpose of guiding the two cards. The thickness of the sheet must be very fine, but it is very rigid and it occupies the horizontal plane between the two cards. As shown in FIG. 5a, both of the cards pass through the endpiece and extend into the module.

As in the embodiment of FIG. 4, the flush contacts 133 and 136 are connected to a printed circuit housed inside the interface and to the terminals of a connector half situated at the end of the interface. In this embodiment, the smart cards are offset inside the housing and they extend in the same direction with their contact tabs facing the flush contactors in the top inside surface of the housing. This embodiment possesses the advantage that the contactors are connected to or integrated with a single printed circuit which is positioned above the housing inside the interface.

In other embodiments, the contactors for the first and second cards could be formed in the bottom inside surface of the housing. In addition, the housing may have the same width throughout, the cards being superposed back to back in the housing with their contacts facing flush contactors situated in the top and bottom surfaces of the housing.

From the embodiments described above, other embodiments can easily be devised without going beyond the ambit of the present invention. Thus, in the embodiment shown in FIG. 1, the thickness of the endpiece 18 could be greater than that of the module 10. In FIG. 4, the endpiece 78 could contain a plurality of mutually superposed housings 82 so as to make it possible to connect a plurality of smart cards 74 simultaneously to the interface. Similarly, the embodiments shown in FIGS. 2, 3, and 5 could very easily be modified so that more than two smart cards can be simultaneously connected to the interface. The embodiments described comprise a module whose shape and size correspond to a type 2 PCMCIA card, however it is clear that some other type could be used. In addition, as mentioned in the introduction, the interface module may take any other shape or size adapted to a card reader which it is desired to couple with one or more smart cards.

We claim:

1. A portable interface for at least one electronic smart card provided with electrical contact tabs;

wherein the interface is pluggable in a Personal Computer Memory Card International Association (PCMCIA) card reader, and further comprises:

a module of substantially rectangular shape designed to be received in the PCMCIA car reader and complying to the PCMCIA the module having a width corresponding substantially to that of a smart card, and including pluggable electrical connection means at one of its ends for connection with said PCMCIA card reader;

an endpiece secured to the other end of the module and of width greater than the width of the module and including a slot for insertion of the smart card;

a housing of substantially plane shape for receiving at least a portion of the smart card and passing through at least a portion of said endpiece from said slot, said housing including guide and positioning means for the smart card; and electrical connection means for making electrical connections with the electrical contact tabs of the smart card, said means being situated inside the interface.

2. An interface according to claim 1, characterized in that the guide and positioning means are constituted by the side edges and the top and bottom inside surfaces of the housing.

3. An interface according to claim 2 characterized in that the positioning means further includes an end of the housing.

4. An interface according to claim 2 characterized in that the electrical connection means comprises a plurality of contactors situated facing and in contact with said contact tabs of the smart card when said card is in position in said housing.

5. An interface according to claim 1 characterized in that said housing is contained entirely within said endpiece, said electrical connection means then being situated in said endpiece.

6. An interface according to claim 1 characterized in that said housing passes right through said endpiece and extends into said module, said electrical connection means then being situated in said module.

7. An interface according to claim 1, characterized in that the interface includes a plurality of superposed housings, each being capable of receiving an electronic smart card.

8. An interface according to claim 7, characterized in that said housings occupy planes that are substantially parallel.

9. An interface according to claim 7, characterized in that said housings occupy planes that intersect.

10. An interface according to claim 7, characterized in that the interface includes a plurality of housings, said housings being mutually offset.

11. An interface according to claim 1, characterized in that the interface has a single housing with a slot suitable for receiving a plurality of electronic smart cards.

12. An interface according to claim 11, characterized in that the housing becomes narrower along the length of the interface so that the smart cards inserted in the housing are mutually offset.

13. An interface according to claim 1, characterized in that the interface further includes an integrated circuit situated in said module and connecting said electrical connection means to said pluggable electrical connection means for connection with said card reader.

14. An interface according to claim 1 characterized in that the edges of the endpiece in contact with the module form an abutment designed to come into contact with the card reader when the interface is positioned in the card reader.

15. A portable interface for at least one electronic smart card provided with electrical contact tabs; wherein the interface is pluggable in a Personal Computer Memory Card International Association (PCMCIA) card reader, and further comprises:

- a module of substantially rectangular shape designed to be received in the PCMCIA car reader and complying to the PCMCIA the module having a width corresponding substantially to that of a smart card, and including pluggable electrical connection means at one of its ends for connection with said PCMCIA card reader;
- an endpiece secured to the other end of the module and of width greater than the width of the module and including a slot for insertion of the smart card;
- a housing of substantially plane shape for receiving at least a portion of the smart card and passing through at least a portion of said endpiece from said slot, said housing including guide and positioning means for the smart card, the guide and positioning means comprise side edges and top and bottom inside surfaces of the housing; and the positioning means further includes an end of the housing;
- electrical connection means for making electrical connections with the electrical contact tabs of the smart card, said means being situated inside the interface.

16. A portable interface for at least one electronic smart card provided with electrical contact tabs; wherein the interface is pluggable in a Personal Computer Memory Card International Association (PCMCIA) card reader, and further comprises:

- a module of substantially rectangular shape designed to be received in the PCMCIA car reader and complying to the PCMCIA the module having a width corresponding substantially to that of a smart card, and including pluggable electrical connection means at one of its ends for connection with said PCMCIA card reader;
- an endpiece secured to the other end of the module and of width greater than the width of the module and including a slot for insertion of the smart card;
- a single housing having a slot suitable for receiving a plurality of electronic smart cards, the housing being of substantially plane shape for receiving at least a portion of the smart card and passing through at least a portion of said endpiece from said slot, said housing including guide and positioning means for the smart card and the housing becoming narrower along the length of the interface so that the smart cards inserted in the housing are mutually offset; and
- electrical connection means for making electrical connections with the electrical contact tabs of the smart card, said means being situated inside the interface.

* * * * *